United States Patent
Kottilingam et al.

(10) Patent No.: US 10,369,630 B2
(45) Date of Patent: Aug. 6, 2019

(54) POLYHEDRAL-SEALED ARTICLE AND METHOD FOR FORMING POLYHEDRAL-SEALED ARTICLE

(71) Applicant: GENERAL ELECTRIC COMPANY, Schenectady, NY (US)

(72) Inventors: Srikanth Chandrudu Kottilingam, Greenville, SC (US); Brian Lee Tollison, Honea Path, SC (US); Yan Cui, Greenville, SC (US); Surinder Singh Pabla, Greer, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 128 days.

(21) Appl. No.: 15/442,184

(22) Filed: Feb. 24, 2017

(65) Prior Publication Data

US 2018/0243830 A1    Aug. 30, 2018

(51) Int. Cl.
*B22F 7/08* (2006.01)
*B33Y 80/00* (2015.01)
(Continued)

(52) U.S. Cl.
CPC ............... *B22F 7/08* (2013.01); *B22F 3/008* (2013.01); *B29C 64/165* (2017.08); *B33Y 10/00* (2014.12);
(Continued)

(58) Field of Classification Search
CPC ........ B22F 3/008; B22F 7/08; B29C 67/0081; B29K 2105/16; B29K 2505/00; B29L 2031/7504; B33Y 10/00; B33Y 40/00; B33Y 80/00; F01D 11/127; F05D 2240/55; F05D 2250/283
See application file for complete search history.

(56) References Cited

U.S. PATENT DOCUMENTS

| 2004/0265120 | A1* | 12/2004 | Tuffs | F01D 11/127 415/170.1 |
| 2008/0258404 | A1* | 10/2008 | Pillhoefer | C23C 10/02 277/415 |

(Continued)

OTHER PUBLICATIONS

Mouritz, Introduction to Aerospace Materials: Chap. 12 Superalloys for gas turbine engines, (2012), pp. 251-267. (Year: 2012).*

*Primary Examiner* — David Sample
*Assistant Examiner* — Elizabeth Collister
(74) *Attorney, Agent, or Firm* — McNees Wallace & Nurick LLC

(57) ABSTRACT

A polyhedral-sealed article is disclosed including an article having a surface and a polyhedral seal layer disposed on the surface. The polyhedral seal layer includes a polyhedral structure having a plurality of polyhedral units. The polyhedral seal layer further includes at least one of a composition including an HTW composition, a heterogeneous pattern of the polyhedral structure, an orientation of the polyhedral structure extending from the surface at non-orthogonal angle, and at least one polyhedral unit conformation other than a hexagonal prism. A method for forming the polyhedral-sealed article is disclosed including forming a polyhedral seal layer by binder jet additive manufacturing and disposing the polyhedral seal layer on a surface of an article.

19 Claims, 3 Drawing Sheets

(51) Int. Cl.
*B33Y 10/00* (2015.01)
*B22F 3/00* (2006.01)
*F01D 11/12* (2006.01)
*B29C 64/165* (2017.01)
*B29K 105/16* (2006.01)
*B29L 31/00* (2006.01)
*B29K 505/00* (2006.01)

(52) U.S. Cl.
CPC ............ B33Y 80/00 (2014.12); F01D 11/127 (2013.01); *B22F 2998/10* (2013.01); *B29K 2105/16* (2013.01); *B29K 2505/00* (2013.01); *B29L 2031/7504* (2013.01); *F05D 2240/55* (2013.01); *F05D 2250/132* (2013.01); *F05D 2250/283* (2013.01); *F05D 2250/38* (2013.01); *F05D 2300/171* (2013.01); *F05D 2300/174* (2013.01); *F05D 2300/175* (2013.01)

(56) References Cited

U.S. PATENT DOCUMENTS

| | | | |
|---|---|---|---|
| 2013/0175325 A1* | 7/2013 | Lin | C23C 10/48 228/124.1 |
| 2014/0356142 A1* | 12/2014 | Arikawa | F01D 11/127 415/173.4 |
| 2016/0003083 A1* | 1/2016 | Delisle | F01D 11/122 60/805 |
| 2017/0058689 A1* | 3/2017 | Gaebler | F04D 29/526 |

* cited by examiner

POLYHEDRAL-SEALED ARTICLE AND METHOD FOR FORMING POLYHEDRAL-SEALED ARTICLE

FIELD OF THE INVENTION

The present invention is directed to sealed articles and methods for forming sealed articles. More particularly, the present invention is directed to sealed articles and methods for forming sealed articles including a polyhedral seal layer.

BACKGROUND OF THE INVENTION

In gas turbines, as well as certain other machines having moving parts, increased efficiency may be achieved by minimizing and maintaining clearance between a rotating part and the surrounding structure, such as minimizing the clearance between rotating buckets and a surrounding shroud. Various sealing structures, such as honeycomb structures having repeating units of open hexagonal prisms are known, but include limitations.

Known honeycomb sealing structures are not formed from hard-to-weld (HTW) alloys, such as nickel-based superalloys and certain aluminum-titanium alloys, due to their gamma prime and various geometric constraints, which are susceptible to gamma prime strain aging, liquation and hot cracking. These HTW alloys are also difficult to join when the gamma prime phase is present in volume fractions greater than about 30%, which may occur when aluminum or titanium content exceeds about 3%. Further, honeycomb sealing structures may require significant oxidation resistance, and nickel-based superalloys which have significant oxidation resistance typically do not exhibit acceptable weldability for commercial processes. As used herein, an "HTW alloy" is an alloy which exhibits liquation, hot and strain-age cracking, and which is therefore impractical to weld.

Additionally, known honeycomb sealing structures formed by known methods include homogenous patterns of the honeycomb structure, are oriented such that the open hexagonal prism repeating units of the honeycomb structure extend from the surface on which they are disposed at an orthogonal angle, and are limited to open hexagonal prism repeating units. As used herein, "open" in relation to polyhedrons such as prisms refers to a polyhedron which is missing a face, such as, in the case of a honeycomb structure, missing the open base face distal from the surface on which the sealing structure rests, thereby presenting open hexagonal cells.

BRIEF DESCRIPTION OF THE INVENTION

In an exemplary embodiment, a polyhedral-sealed article includes an article having a surface and a polyhedral seal layer disposed on the surface. The polyhedral seal layer includes a polyhedral structure having a plurality of polyhedral units. The polyhedral seal layer further includes at least one of a composition including an HTW composition, a heterogeneous pattern of the polyhedral structure, an orientation of the polyhedral structure extending from the surface at non-orthogonal angle, and at least one polyhedral unit conformation other than a hexagonal prism.

In another exemplary embodiment, a method for forming a polyhedral-sealed article includes forming a polyhedral seal layer by binder jet additive manufacturing and disposing the polyhedral seal layer on a surface of an article, wherein the polyhedral seal layer includes a polyhedral structure.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
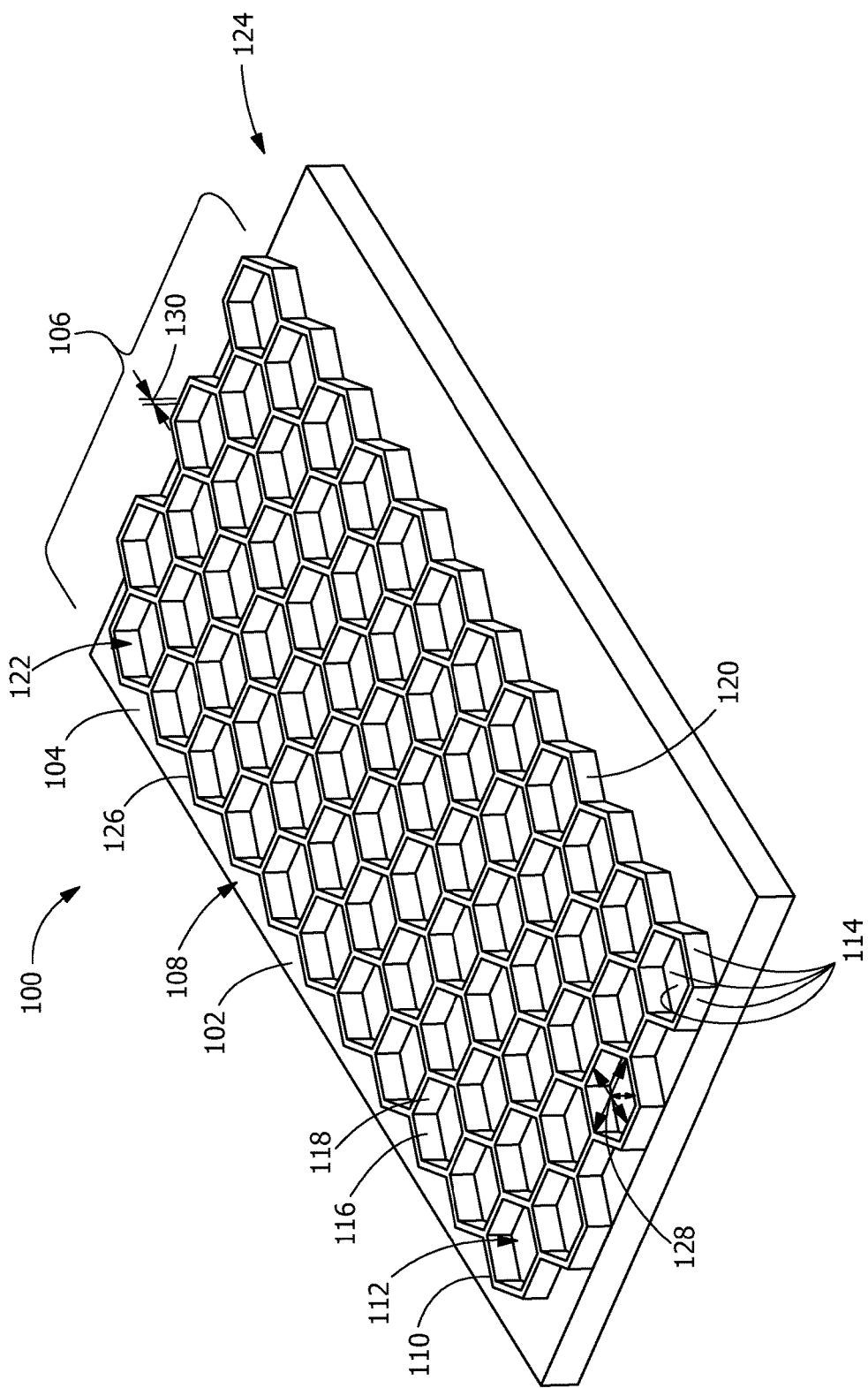
FIG. 1 is a perspective view of a polyhedral-sealed article including a honeycomb structure, according to an embodiment of the present disclosure.

Provided are exemplary sealed articles and methods for forming sealed articles. Embodiments of the present disclosure, in comparison to sealed articles and methods for forming sealed articles not utilizing one or more features disclosed herein, improve mechanical properties, improve material selection, improve groove formation, improve oxidation resistance, improve porosity control, improve elevated temperature performance, increase joining capability, increase joint quality, increase durability, increase strength, improve efficiency, improve sealing, or a combination thereof.

Referring to FIGS. 1-4, in one embodiment, a polyhedral-sealed article 100 includes an article 102 having a surface 104, and a polyhedral seal layer 106 disposed on the surface 104. The polyhedral seal layer 106 includes a polyhedral structure 108 having a plurality of polyhedral units 110. The plurality of polyhedral units 110 include at least one polyhedral unit conformation 112.

The article 102 may be any suitable article 102, including, but not limited to, a gas turbine article, a turbo-charger article, or a steam turbine article. Suitable gas turbine articles include, but are not limited to, hot gas path articles, nozzles (also known as vanes) in contact with angel wings, shrouds, buckets (also known as blades), and rotating parts.

The article 102 may include any suitable material, including, but not limited to, iron-based alloys, steel alloys, carbon steel alloys, stainless steel alloys, nickel-based alloys, cobalt-based alloys, titanium-based alloys, titanium-aluminum alloys, refractory alloys, superalloys, nickel-based superalloys, cobalt-based superalloys, iron-based superalloys, or combinations thereof. In one embodiment, the surface 104 of the article 102 consists of the material, and the polyhedral-sealed layer 106 is disposed directly on the surface 104. In another embodiment, the article 102 may include a coating forming the surface 104 such as, but not limited to, a bond coating, a thermal barrier coating, an environmental barrier coating, or combinations thereof, and the polyhedral-sealed layer 106 is disposed directly on the coating of the article 102 as the surface 104. In a further embodiment, the article 102 consists of the material and the coating.

The at least one polyhedral unit conformation 112 may include any suitable polyhedra, including, but not limited to, polyhedra having between four and thirty-two faces 114, polyhedra having between four and thirty-two faces 114 with at least one face being an open face 116, prisms having between five and twelve faces 114, prisms having between five and twelve faces 114 with at least one face being an open face 116, prisms having between five and twelve faces 114 with at least one face being an open base face 118, or combinations thereof. Specific exemplary polyhedra may include, but are not limited to, tetrahedra, pentahedra, hexahedra, heptahedra, octahedra, nonahedra, decahedra, dodecahedra, icosahedra, icosidodecahedra, triangular prisms, cubes, rectangular prisms, pentagonal prisms, hexagonal prisms 122, heptagonal prisms, octagonal prisms, nonagonal prisms, decagonal prisms, antiprism variations thereof, regular variations thereof, irregular variations thereof, distorted variations thereof, rounded variations thereof, and open-faced variations thereof. As used herein with respect to rounded variations of polyhedral, it is understood and intended that rounded variations of polyhedral with seven or more faces 114 may be practically indistinguishable from, and therefore encompass, other geometric conformations including, but not limited to, cylinders, spheroids, and spheres. Further, reference to a polyhedral is intended to refer to the antiprism variations thereof (where applicable), regular variations thereof, irregular variations thereof, distorted variations thereof, rounded variations thereof, and open-faced variations thereof simultaneously, unless otherwise expressly indicated.

In one embodiment, at least one face 114 of the plurality of the polyhedral units 110 is a closed face 120 defined by the surface 104. In a further embodiment, the plurality of polyhedral units 110 includes, alternatively, consists of, hexagonal prisms 122 with at least one open base face 118, forming a honeycomb structure 124.

Referring to FIG. 1, in one embodiment, the polyhedral seal layer 106 includes a composition 126. The composition 126 may be constant across the polyhedral seal layer 106 or may vary across the polyhedral seal layer 106. The composition 126 may be any suitable material, including, but not limited to, an HTW composition. As used herein, an "HTW composition" includes HTW alloys and is also understood to include other materials which are as impractical to weld, such as pre-sintered preform (PSP) materials and MCrAlY materials. In one embodiment, the HTW composition consists of HTW alloys, PSP materials, MCrAlY materials, or combinations thereof. In another embodiment, the composition 126 is free of the HTW composition, and may include iron alloys, steel alloys, carbon steel alloys, stainless steel alloys, aluminum and magnesium alloys, copper, copper alloys, nickel, nickel alloys, titanium, titanium alloys, cobalt, cobalt alloys, or combinations thereof.

Suitable HTW alloys may include, but are not limited to, refractory alloys, superalloys, nickel-based superalloys, cobalt-based superalloys, iron-based superalloys, aluminum-titanium superalloys, CMSX-4, CMSX10, DS Siemet, GTD 111, GTD 222, GTD 262, GTD 444, INCONEL 100, INCONEL 700, INCONEL 738, INCONEL 792, INCONEL 939, Mar-M-200, Mar-M-247, MGA1400, MGA2400, PWA 1480, PWA 1483, PWA 1484, René N2, René N4, René N5, René N6, René 65, René 77, René 80, René 88DT, René 104, René 108, René 125, René 142, René 195, René N500, René N515, TMS-75, TMS-82, UDIMET 500, and combinations thereof.

In one embodiment, the PSP materials include a first alloy and a second alloy intermixed with one another as distinct phases. The first alloy may include a first melting point of at least about 2,400° F., and the second alloy may include a second melting point of below about 2,350° F. The first alloy may include HTW alloys, refractory alloys, superalloys, nickel-based superalloys, cobalt-based superalloys, iron-based superalloys, titanium-aluminum superalloys, iron-based alloys, steel alloys, stainless steel alloys, cobalt-based alloys, nickel-based alloys, titanium-based alloys, GTD 111, GTD 444, HAYNES 188, HAYNES 230, INCONEL 738, L605, MAR-M-247, MAR-M-509, René 108, René 142, René 195, René N2, or combinations thereof. The second alloy may include braze alloys, iron-based alloys, steel alloys, stainless steel alloys, cobalt-based alloys, nickel-based alloys, titanium-based alloys, DF-4B, D15, MAR-M-509B, BNi-2, BNi-3, BNi-5, BNi-6, BNi-7, BNi-9, BNi-10, or combinations thereof. In one embodiment, the PSP materials further include a ceramic additive, such as, but not limited to, aluminum oxide, silicon carbide, tungsten carbide, titanium nitride, titanium carbonitride, titanium carbide, or combinations thereof.

As used herein, "BNi-2" refers to an alloy including a composition, by weight, of about 3% iron, about 3.1% boron, about 4.5% silicon, about 7% chromium, and a balance of nickel.

As used herein, "BNi-3" refers to an alloy including a composition, by weight, of about 4.5% silicon, about 3% boron, and a balance of nickel.

As used herein, "BNi-5" refers to an alloy including a composition, by weight, of about 10% silicon, about 19% chromium, and a balance of nickel.

As used herein, "BNi-6" refers to an alloy including a composition, by weight, of about 11% phosphorous and a balance of nickel.

As used herein, "BNi-7" refers to an alloy including a composition, by weight, of about 14% chromium, about 10% phosphorous, and a balance of nickel.

As used herein, "BNi-9" refers to an alloy including a composition, by weight, of about 15% chromium, about 3% boron, and a balance of nickel.

As used herein, "BNi-10" refers to an alloy including a composition, by weight, of about 11.5% chromium, about 3.5% silicon, about 2.5% boron, about 3.5% iron, about 0.5% carbon, about 16% tungstem, and a balance of nickel.

As used herein, "CMSX-4" refers to an alloy including a composition, by weight, of about 6.4% chromium, about 9.6% cobalt, about 0.6% molybdenum, about 6.4% tungsten, about 5.6% aluminum, about 1.0% titanium, about 6.5% tantalum, about 3% rhenium, about 0.1% hafnium, and a balance of nickel.

As used herein, "CMSX-10" refers to an alloy including a composition, by weight, of about 2% chromium, about 3% cobalt, about 0.4% molybdenum, about 5% tungsten, about 5.7% aluminum, about 0.2% titanium, about 8% tantalum, about 6% rhenium, and a balance of nickel.

As used herein, "DF-4B" refers to an alloy including a composition, by weight, of about 14% chromium, about 10% cobalt, about 3.5% aluminum, about 2.5% tantalum, about 2.75% boron, about 0.05% yttrium, and a balance of nickel.

As used herein, "D15" refers to an alloy including a composition, by weight, of about 15% chromium, about 10.25% cobalt, about 3.5% tantalum, about 3.5% aluminum, about 2.3% boron, and a balance of nickel.

As used herein, "DS Siemet" refers to an alloy including a composition, by weight, of about 9% cobalt, about 12.1% chromium, about 3.6% aluminum, about 4% titanium, about 5.2% tantalum, about 3.7% tungsten, about 1.8% molybdenum, and a balance of nickel.

As used herein, "GTD 111" refers to an alloy including a composition, by weight, of about 14% chromium, about 9.5% cobalt, about 3.8% tungsten, about 4.9% titanium, about 3% aluminum, about 0.1% iron, about 2.8% tantalum, about 1.6% molybdenum, about 0.1% carbon, and a balance of nickel.

As used herein, "GTD 222" refers to an alloy including a composition, by weight, of about 23.5% chromium, about 19% cobalt, about 2% tungsten, about 0.8% niobium, about 2.3% titanium, about 1.2% aluminum, about 1% tantalum, about 0.25% silicon, about 0.1% manganese, and a balance of nickel.

As used herein, "GTD 262" refers to an alloy including a composition, by weight, of about 22.5% chromium, about 19% cobalt, about 2% tungsten, about 1.35% niobium, about 2.3% titanium, about 1.7% aluminum, about 0.1% carbon, and a balance of nickel.

As used herein, "GTD 444" refers to an alloy including a composition, by weight, of about 7.5% cobalt, about 0.2% iron, about 9.75% chromium, about 4.2% aluminum, about 3.5% titanium, about 4.8% tantalum, about 6% tungsten, about 1.5% molybdenum, about 0.5% niobium, about 0.2% silicon, about 0.15% hafnium, and a balance of nickel.

As used herein, "HAYNES 188" refers to an alloy including a composition, by weight, of about 22% chromium, about 22% nickel, about 0.1% carbon, about 3% iron, about 1.25% manganese, about 0.35% silicon, about 14% tungsten, about 0.03% lanthanum, and a balance of cobalt.

As used herein, "HAYNES 230" refers to an alloy including a composition, by weight, of about 22% chromium, about 2% molybdenum, about 0.5% manganese, about 0.4% silicon, about 14% tungsten, about 0.3% aluminum, about 0.1% carbon, about 0.02% lanthanum, and a balance of nickel.

As used herein, "INCONEL 100" refers to an alloy including a composition, by weight, of about 10% chromium, about 15% cobalt, about 3% molybdenum, about 4.7% titanium, about 5.5% aluminum, about 0.18% carbon, and a balance of nickel.

As used herein, "INCONEL 700" refers to an alloy including a composition, by weight, of up to about 0.12% carbon, about 15% chromium, about 28.5% cobalt, about 3.75% molybdenum, about 2.2% titanium, about 3% aluminum, about 0.7% iron, up to about 0.3% silicon, up to about 0.1% manganese, and a balance of nickel.

As used herein, "INCONEL 738" refers to an alloy including a composition, by weight, of about 0.17% carbon, about 16% chromium, about 8.5% cobalt, about 1.75% molybdenum, about 2.6% tungsten, about 3.4% titanium, about 3.4% aluminum, about 0.1% zirconium, about 2% niobium, and a balance of nickel.

As used herein, "INCONEL 792" refers to an alloy including a composition, by weight, of about 12.4% chromium, about 9% cobalt, about 1.9% molybdenum, about 3.8% tungsten, about 3.9% tantalum, about 3.1% aluminum, about 4.5% titanium, about 0.12% carbon, about 0.1% zirconium, and a balance of nickel.

As used herein, "INCONEL 939" refers to an alloy including a composition, by weight, of about 0.15% carbon, about 22.5% chromium, about 19% cobalt, about 2% tungsten, about 3.8% titanium, about 1.9% aluminum, about 1.4% tantalum, about 1% niobium, and a balance of nickel.

As used herein, "L605" refers to an alloy including a composition, by weight, of about 20% chromium, about 10% nickel, about 15% tungsten, about 0.1% carbon, and a balance of cobalt.

As used herein, "Mar-M-200" refers to an alloy including a composition, by weight, of about 9% chromium, about 10% cobalt, about 12.5% tungsten, about 1% columbium, about 5% aluminum, about 2% titanium, about 10.14% carbon, about 1.8% hafnium, and a balance of nickel.

As used herein, "MAR-M-247" refers to an alloy including a composition, by weight, of about 5.5% aluminum, about 0.15% carbon, about 8.25% chromium, about 10% cobalt, about 10% tungsten, about 0.7% molybdenum, about 0.5% iron, about 1% titanium, about 3% tantalum, about 1.5% hafnium, and a balance of nickel.

As used herein, "MAR-M-509" refers to an alloy including a composition, by weight, of about 24% chromium, about 10% nickel, about 7% tungsten, about 3.5% tantalum, about 0.5% zirconium, about 0.6% carbon, and a balance of cobalt.

As used herein, "MAR-M-509B" refers to an alloy including a composition, by weight, of about 23.5% chromium, about 10% nickel, about 7% tungsten, about 3.5% tantalum, about 0.45% zirconium, about 2.9% boron, about 0.6% carbon, about 0.2% titanium, and a balance of cobalt.

As used herein, "MGA1400" refers to an alloy including a composition, by weight, of about 10% cobalt, about 14% chromium, about 4% aluminum, about 2.7% titanium, about 4.7% tantalum, about 4.3% tungsten, about 1.5% molybdenum, about 0.1% carbon, and a balance of nickel.

As used herein, "MGA2400" refers to an alloy including a composition, by weight, of about 19% cobalt, about 19% chromium, about 1.9% aluminum, about 3.7% titanium, about 1.4% tantalum, about 6% tungsten, about 1% niobium, about 0.1% carbon, and a balance of nickel.

As used herein, "PMA 1480" refers to an alloy including a composition, by weight, of about 10% chromium, about 5% cobalt, about 5% aluminum, about 1.5% titanium, about 12% tantalum, about 4% tungsten, and a balance of nickel.

As used herein, "PWA 1483" refers to an alloy including a composition, by weight, of about 9% cobalt, about 12.2% chromium, about 3.6% aluminum, about 4.1% titanium, about 5% tantalum, about 3.8% tungsten, about 1.9% molybdenum, and a balance of nickel.

As used herein, "PMA 1484" refers to an alloy including a composition, by weight, of about 5% chromium, about 10% cobalt, about 2% molybdenum, about 5.6% aluminum, about 9% tantalum, about 6% tungsten, and a balance of nickel.

As used herein, "René 65" refers to an alloy including a composition, by weight, of about 13% cobalt, up to about 1.2% iron, about 16% chromium, about 2.1% aluminum, about 3.75% titanium, about 4% tungsten, about 4% molybdenum, about 0.7% niobium, up to about 0.15% manganese, and a balance of nickel.

As used herein, "René 77 (Udimet 700)" refers to an alloy including a composition, by weight, of about 15% chromium, about 17% cobalt, about 5.3% molybdenum, about 3.35% titanium, about 4.2% aluminum, and a balance of nickel.

As used herein, "René 80" refers to an alloy including a composition, by weight, of about 14% chromium, about 9.5% cobalt, about 4% molybdenum, about 3% aluminum, about 5% titanium, about 4% tungsten, about 0.17% carbon, and a balance of nickel.

As used herein, "René 88DT" refers to an alloy including a composition, by weight, of about 16% chromium, about 13% cobalt, about 4% molybdenum, about 0.7% niobium, about 2.1% aluminum, about 3.7% titanium, about 4% tungsten, about 0.1% rhenium, a maximum of about 4.3% rhenium and tungsten, and a balance of nickel.

As used herein, "René 104" refers to an alloy including a composition, by weight, of about 13.1% chromium, about 18.2% cobalt, about 3.8% molybdenum, about 1.9% tungsten, about 1.4% niobium, about 3.5% aluminum, about 3.5% titanium, about 2.7% tantalum, and a balance of nickel.

As used herein, "René 108" refers to an alloy including a composition, by weight, of about 8.4% chromium, about 9.5% cobalt, about 5.5% aluminum, about 0.7% titanium, about 9.5% tungsten, about 0.5% molybdenum, about 3% tantalum, about 1.5% hafnium, and a balance of nickel.

As used herein, "René 125" refers to an alloy including a composition, by weight, of about 8.5% chromium, about 10% cobalt, about 4.8% aluminum, up to about 2.5% titanium, about 8% tungsten, up to about 2% molybdenum, about 3.8% tantalum, about 1.4% hafnium, about 0.11% carbon, and a balance of nickel.

As used herein, "René 142" refers to an alloy including a composition, by weight, of about 6.8% chromium, about 12% cobalt, about 6.1% aluminum, about 4.9% tungsten, about 1.5% molybdenum, about 2.8% rhenium, about 6.4% tantalum, about 1.5% hafnium, and a balance of nickel.

As used herein, "René 195" refers to an alloy including a composition, by weight, of about 7.6% chromium, about 3.1% cobalt, about 7.8% aluminum, about 5.5% tantalum, about 0.1% molybdenum, about 3.9% tungsten, about 1.7% rhenium, about 0.15% hafnium, and a balance of nickel.

As used herein, "René N2" refers to an alloy including a composition, by weight, of about 7.5% cobalt, about 13% chromium, about 6.6% aluminum, about 5% tantalum, about 3.8% tungsten, about 1.6% rhenium, about 0.15% hafnium, and a balance of nickel.

As used herein, "René N4" refers to an alloy including a composition, by weight, of about 9.75% chromium, about 7.5% cobalt, about 4.2% aluminum, about 3.5% titanium, about 1.5% molybdenum, about 6.0% tungsten, about 4.8% tantalum, about 0.5% niobium, about 0.15% hafnium, and a balance of nickel.

As used herein, "René N5" refers to an alloy including a composition, by weight, of about 7.5% cobalt, about 7.0% chromium, about 6.5% tantalum, about 6.2% aluminum, about 5.0% tungsten, about 3.0% rhenium, about 1.5% molybdenum, about 0.15% hafnium, and a balance of nickel.

As used herein, "René N500" refers to an alloy including a composition, by weight, of about 7.5% cobalt, about 0.2% iron, about 6% chromium, about 6.25% aluminum, about 6.5% tantalum, about 6.25% tungsten, about 1.5% molybdenum, about 0.15% hafnium, and a balance of nickel.

As used herein, "René N515" refers to an alloy including a composition, by weight, of about 7.5% cobalt, about 0.2% iron, about 6% chromium, about 6.25% aluminum, about 6.5% tantalum, about 6.25% tungsten, about 2% molybdenum, about 0.1% niobium, about 1.5% rhenium, about 0.6% hafnium, and a balance of nickel.

As used herein, "René N6" refers to an alloy including a composition, by weight, of about 12.5% cobalt, about 4.2% chromium, about 7.2% tantalum, about 5.75% aluminum, about 6% tungsten, about 5.4% rhenium, about 1.4% molybdenum, about 0.15% hafnium, and a balance of nickel.

As used herein, "TMS-75" refers to an alloy including a composition, by weight, of about 3.5% chromium, about 12.5% cobalt, about 13.7% aluminum, about 2% tungsten, about 1.2% molybdenum, about 1.6% rhenium, about 2% tantalum, about 0.04% hafnium, and a balance of nickel.

As used herein, "TMS-82" refers to an alloy including a composition, by weight, of about 5.8% chromium, about 8.2% cobalt, about 12.2% aluminum, about 0.63% titanium, about 2.9% tungsten, about 1.2% molybdenum, about 0.8% rhenium, about 2.1% tantalum, about 0.04% hafnium, and a balance of nickel.

As used herein, "UDIMET 500" refers to an alloy including a composition, by weight, of about 18.5% chromium, about 18.5% cobalt, about 4% molybdenum, about 3% titanium, about 3% aluminum, and a balance of nickel.

In one embodiment, the polyhedral structure 108 includes a binder jet additive manufacturing deposited structure. The binder jet additive manufacturing deposited structure includes the physical traits characteristic of a material which has been deposited by a binder jet additive manufacturing process, and includes a predetermined porosity. The predetermined porosity may be any suitable porosity, including, but not limited to, a porosity between about 5% and about 45%, alternatively between about 5% and about 25%, alternatively between about 15% and about 35%, alternatively between about 25% and about 45%, alternatively between about 5% and about 15%, alternatively between about 10% and about 20%, alternatively between about 15% and about 25%, alternatively between about 20% and about 30%, alternatively between about 25% and about 35%, alternatively between about 30% and about 40%, alternatively between about 35% and about 45%. The predetermined porosity may provide a density of between about 50% to about 99%, alternatively between about 50% to about 70%, alternatively between about 60% to about 80%, alternatively between about 70% to about 90%, alternatively between about 80% to about 99%.

Figure 2:
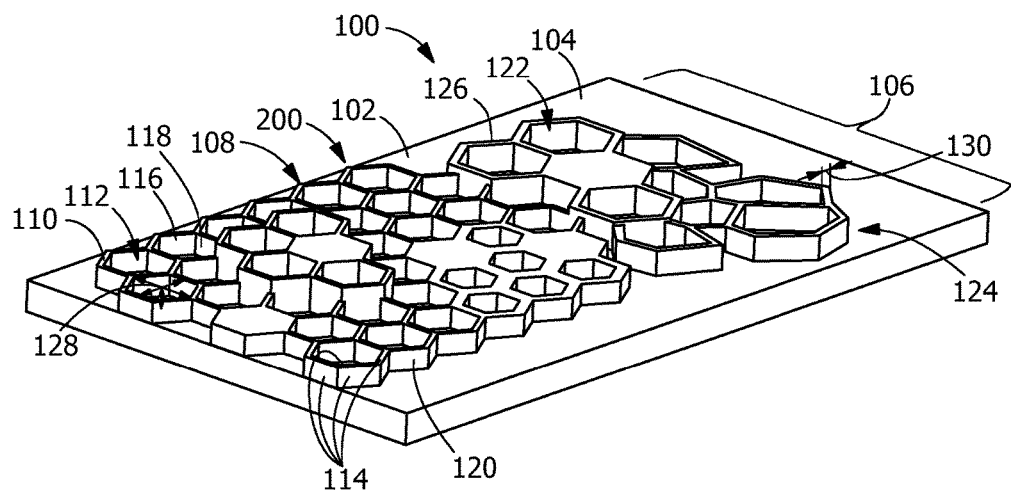
FIG. 2 is a perspective view of a polyhedral-sealed article including a heterogeneous pattern of the polyhedral structure, according to an embodiment of the present disclosure.

Referring to FIG. 2, in one embodiment, the polyhedral seal layer 106 includes a heterogeneous pattern 200 of the polyhedral structure 108. The heterogeneous pattern 200 may include the at least one polyhedral unit conformation 112 varying across the polyhedral seal layer 106, the polyhedral unit dimensions 128 varying across the polyhedral seal layer 106, the polyhedral unit wall thickness 130 varying across the polyhedral seal layer 106, or combinations thereof. The variance of the polyhedral unit conformation 112 may be gradual, abrupt, local, or a combination thereof. The polyhedral unit dimensions 112 may be any dimensions, including, but not limited to, a width between about 0.03 inches to about 0.25 inches, alternatively between about 0.03 inches to about 0.14 inches, alternatively between about 0.08 inches to about 0.19 inches, alternatively between about 0.14 inches to about 0.25 inches, alternatively between about 0.03 inches to about 0.09 inches, alternatively between about 0.06 inches to about 0.12 inches, alternatively between about 0.09 inches to about 0.15 inches, alternatively between about 0.12 inches to about 0.18 inches, alternatively between about 0.15 inches to about 0.21 inches, alternatively between about 0.18 inches to about 0.258 inches. The polyhedral unit dimensions 112 of height and depth may also vary across the polyhedral seal layer 106, dependently or independently, in addition to varying the width or in lieu of varying the width. The polyhedral unit wall thickness 130 may be any suitable thickness, including, but not limited to, a thickness between about 0.003 inches to about 0.015 inches, alternatively between about 0.003 inches to about 0.011 inches, alternatively between about 0.007 inches to about 0.015 inches, alternatively between about 0.003 inches to about 0.007 inches, alternatively between about 0.005 inches to about 0.009 inches, alternatively between about 0.007 inches to about 0.0011 inches, alternatively between about 0.009 inches to about 0.013 inches, alternatively between about 0.011 inches to about 0.015 inches.

Figure 3:
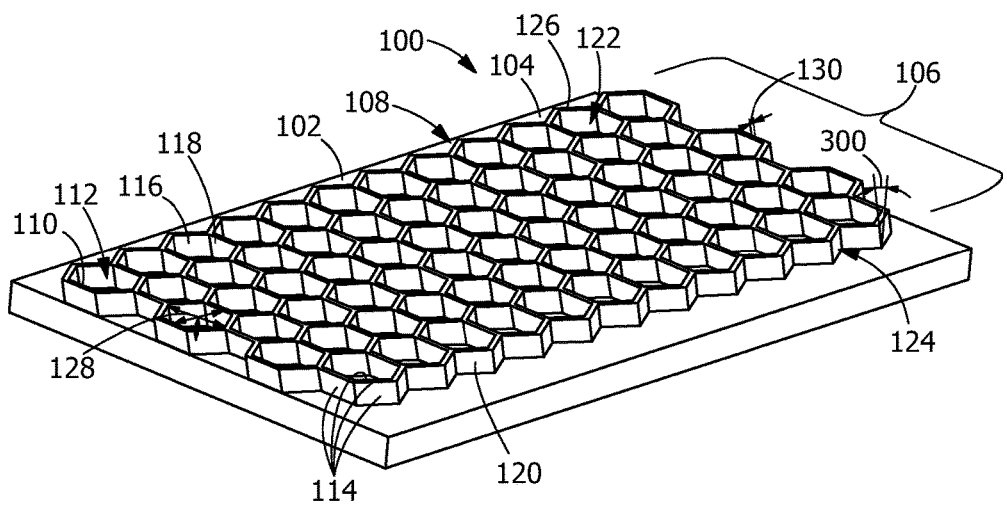
FIG. 3 is a perspective view of a polyhedral-sealed article including non-orthogonal orientation of the polyhedral structure, according to an embodiment of the present disclosure.

Referring to FIGS. 1 and 3, the polyhedral structure 108 may be oriented relative to the surface 104 at any suitable angle 300, from parallel to the surface 104 (not shown) to oblique to the surface 104 (FIG. 3) to orthogonal to the surface 104 (FIG. 1). In one embodiment, the polyhedral structure 108 extends from the surface at a non-orthogonal angle (FIG. 3).

Figure 4:
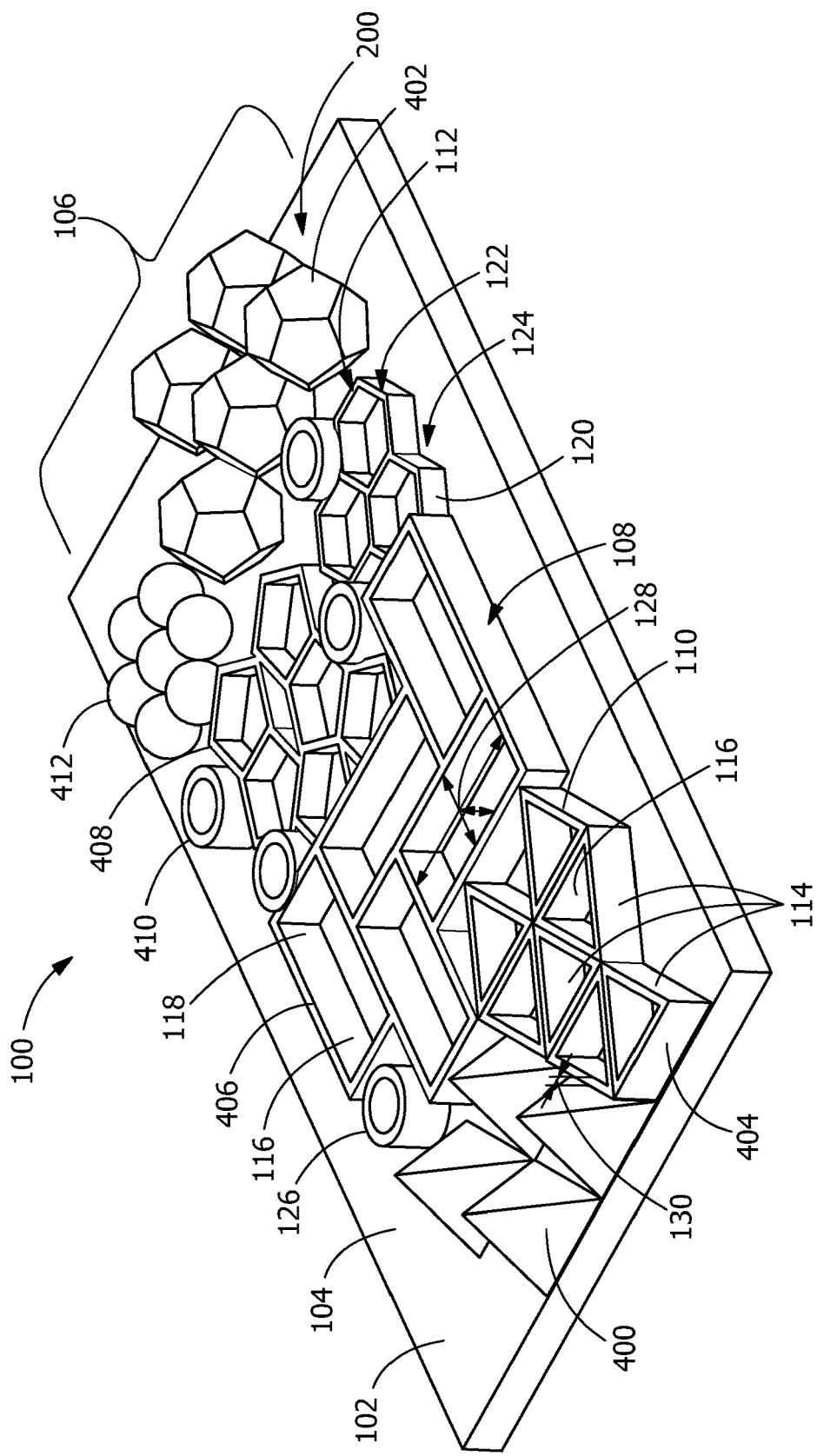
FIG. 4 is a perspective view of a polyhedral-sealed article including at least one non-hexagonal prism polyhedral unit, according to an embodiment of the present disclosure.

Referring to FIG. 4, in one embodiment, the polyhedral seal layer 106 includes at least one polyhedral unit conformation 112 other than a hexagonal prism 122. The at least one polyhedral unit conformation 112 other than hexagonal prism 122 may include any suitable conformation, including, but not limited to, polyhedra having between four and thirty-two faces 114, prisms having between five and twelve faces 114, tetrahedra 400, pentahedra, hexahedra, heptahedra, octahedra, nonahedra, decahedra, dodecahedra 402, icosahedra, icosidodecahedra, triangular prisms 404, cubes, rectangular prisms 406, pentagonal prisms 408, heptagonal prisms, octagonal prisms, nonagonal prisms, decagonal prisms, cylinders 410, and spheres 412.

Referring to FIGS. 1-4, in one embodiment, the polyhedral seal layer 106 includes at least one of, alternatively at least two of, alternatively at least three of, alternatively all of the HTW composition, the heterogeneous pattern 200 of the polyhedral structure 108, the orientation of the polyhedral structure 108 extending from the surface 104 at non-orthogonal angle 300, and the at least one polyhedral unit conformation 112 other than a hexagonal prism 122.

Referring to FIG. 5, in one embodiment, a method for forming a polyhedral-sealed article 100 includes forming the polyhedral seal layer 106 having the polyhedral structure 108 by binder jet additive manufacturing, and disposing the polyhedral seal layer 106 on the surface 104 of an article 102. Forming the polyhedral seal layer 106 and disposing the polyhedral seal layer 106 on the surface 104 may occur simultaneously or in sequence. In a further embodiment, forming the polyhedral seal layer 106 having the polyhedral structure 108 by binder jet additive manufacturing includes depositing successive layers between about 50 µm to about 150 µm thick, alternatively between about 75 µm to about 125 µm thick, alternatively between about 90 µm to about 110 µm thick, alternatively between about 95 µm to about 105 µm thick, alternatively about 100 µm thick, then curing, depowdering, and sintering at temperature suitable for the composition 126, based on the solidus temperature of the composition 126.

In one embodiment, forming the polyhedral seal layer 106 and disposing the polyhedral seal layer 106 on the surface 104 occurs in sequence, and following forming the polyhedral seal layer 106, the polyhedral seal layer 106 is de-bound and sintered, and then disposed on the surface 104 and joined to the surface 104. Joining the polyhedral seal layer 106 to the surface 104 may include brazing the polyhedral seal layer 106 to the surface 104.

In another embodiment, forming the polyhedral seal layer 106 and disposing the polyhedral seal layer 106 on the surface 104 occurs simultaneously, and the polyhedral seal layer 106 is formed by binder jet additive manufacturing directly on the surface 104. Forming the polyhedral seal layer 106 directly on the surface 104 may include forming the article 102 by an additive manufacturing process, such as binder jet additive manufacturing, and forming the polyhedral seal layer 106 as part of the additive manufacturing process.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A polyhedral-sealed article, comprising: an article having a surface; and a polyhedral seal layer disposed on the surface, the polyhedral seal layer including: a polyhedral structure having a plurality of polyhedral units; and a composition including a hard-to-weld (HTW) composition, wherein the HTW composition includes a pre-sintered preform (PSP) material including a first alloy and a second alloy intermixed with one another as distinct phases.

2. The polyhedral-sealed article of claim 1, further including a heterogeneous pattern of the polyhedral structure, an orientation of the polyhedral structure extending from the surface at a non-orthogonal angle, and at least one polyhedral unit conformation other than a hexagonal prism.

3. The polyhedral-sealed article of claim 1, wherein the plurality of polyhedral units include the polyhedral unit conformation selected from the group consisting of polyhedra having between four and thirty-two faces, polyhedra having between four and thirty-two faces with at least one face being an open face, prisms having between five and twelve faces, prisms having between five and twelve faces with at least one face being an open face, prisms having between five and twelve faces with at least one face being an open base face, and combinations thereof.

4. The polyhedral-sealed article of claim 1, wherein the polyhedral unit conformation varies across the polyhedral seal layer.

5. The polyhedral-sealed article of claim 1, wherein at least one face of the plurality of the polyhedral units is a closed face formed by the surface.

6. The polyhedral-sealed article of claim 1, wherein the plurality of polyhedral units include hexagonal prisms with the at least one open base face, forming a honeycomb structure.

7. The polyhedral-sealed article of claim 1, wherein the plurality of polyhedral units includes polyhedral unit dimensions which vary across the polyhedral seal layer.

8. The polyhedral-sealed article of claim 1, wherein the plurality of polyhedral units includes a polyhedral unit wall thickness which varies across the polyhedral seal layer.

9. The polyhedral-sealed article of claim 1, wherein the polyhedral seal layer includes a composition which varies across the polyhedral seal layer.

10. The polyhedral-sealed article of claim 1, wherein the article is selected from the group consisting of a gas turbine article, a turbo-charger article, and a steam turbine article.

11. The polyhedral-sealed article of claim 10, wherein the article is a gas turbine article selected from the group consisting of a hot gas path article, a nozzle in contact with angel wings, a shroud, a bucket, and a rotating part.

12. The polyhedral-sealed article of claim 1, wherein the polyhedral structure includes a binder jet additive manufacturing deposited structure, the binder jet additive manufacturing deposited structure including a predetermined porosity between about 5% to about 45%.

13. The polyhedral-sealed article of claim 1, wherein the HTW composition includes an HTW alloy selected from the group consisting of a refractory alloy, a superalloy, a nickel-based superalloy, a cobalt-based superalloy, an iron-based superalloy, an aluminum-titanium superalloy, CMSX-4, CMSX10, DS Siemet, GTD 111, GTD 222, GTD 262, GTD 444, INCONEL 100, INCONEL 700, INCONEL 738, INCONEL 792, INCONEL 939, Mar-M-200, Mar-M-247, MGA1400, MGA2400, PWA 1480, PWA 1483, PWA 1484, René N2, René N4, René N5, René N6, René 65, René 77, René 80, René 88DT, René 104, René 108, René 125, René 142, René 195, René N500, René N515, TMS-75, TMS-82, UDIMET 500, and combinations thereof.

14. The polyhedral-sealed article of claim 1, wherein the HTW composition includes an MCrAlY.

15. The polyhedral-sealed article of claim 1, wherein the first alloy includes a first melting point of at least 2,400° F. and the second alloy includes a second melting point below 2,350° F.

16. The polyhedral-sealed article of claim 1, wherein the first alloy is selected from the group consisting of an HTW alloy, a refractory alloy, a superalloy, a nickel-based superalloy, a cobalt-based superalloy, an iron-based superalloy, a titanium-aluminum superalloy, an iron-based alloy, a steel alloy, a stainless steel alloy, a cobalt-based alloy, a nickel-based alloy, a titanium-based alloy, GTD 111, GTD 444, HAYNES 188, HAYNES 230, INCONEL 738, L605, MAR-M-247, MAR-M-509, René 108, René 142, René 195, René N2, and combinations thereof, and the second alloy is selected from the group consisting of a braze alloy, an iron-based alloy, a steel alloy, a stainless steel alloy, a cobalt-based alloy, a nickel-based alloy, a titanium-based alloy, DF-4B, D15, MAR-M-509B, BNi-2, BNi-3, BNi-5, BNi-6, BNi-7, BNi-9, BNi-10, and combinations thereof.

17. A method for forming a polyhedral-sealed article, comprising:
    forming a polyhedral seal layer by binder jet additive manufacturing, the polyhedral seal layer including a polyhedral structure having a plurality of polyhedral units and a composition including a hard-to-weld (HTW) composition; and
    disposing the polyhedral seal layer on a surface of an article,
    wherein the HTW composition includes a pre-sintered preform (PSP) material including a first alloy and a second alloy intermixed with one another as distinct phases.

18. The method of claim 17, further including, either forming the polyhedral seal layer directly on the surface or following forming the polyhedral seal layer, de-binding and sintering the polyhedral seal layer, and then disposing the polyhedral seal layer on the surface and joining the polyhedral seal layer to the surface.

19. The method of claim 17, wherein forming the polyhedral seal layer includes forming the polyhedral structure having a plurality of polyhedral units, and at least one of:
    a heterogeneous pattern of the polyhedral structure;
    an orientation of the polyhedral structure extending from the surface at a non-orthogonal angle; and
    at least one polyhedral unit conformation other than a hexagonal prism.

* * * * *